(12) United States Patent
Ochiai et al.

(10) Patent No.: US 10,399,426 B2
(45) Date of Patent: Sep. 3, 2019

(54) CONTROL DEVICE FOR HYBRID VEHICLE AND CONTROL METHOD

(71) Applicant: NISSAN MOTOR CO., LTD., Kanagawa (JP)

(72) Inventors: Kazuki Ochiai, Kanagawa (JP); Hiroshi Arita, Kanagawa (JP); Masashi Ono, Kanagawa (JP); Kakuzou Kaneko, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 64 days.

(21) Appl. No.: 15/559,537

(22) PCT Filed: Mar. 19, 2015

(86) PCT No.: PCT/JP2015/058356
§ 371 (c)(1),
(2) Date: Sep. 19, 2017

(87) PCT Pub. No.: WO2016/147406
PCT Pub. Date: Sep. 22, 2016

(65) Prior Publication Data
US 2018/0093556 A1    Apr. 5, 2018

(51) Int. Cl.
*B60K 6/26* (2007.10)
*B60K 6/48* (2007.10)
(Continued)

(52) U.S. Cl.
CPC ............... *B60K 6/26* (2013.01); *B60K 6/48* (2013.01); *B60K 6/543* (2013.01); *B60K 6/547* (2013.01); *B60W 10/06* (2013.01); *B60W 10/08* (2013.01); *B60W 10/26* (2013.01); *B60W 10/30* (2013.01); *B60W 20/10* (2013.01); *B60W 20/13* (2016.01); *B60W 30/18063* (2013.01); *B60W 2510/244* (2013.01); *B60W 2510/305* (2013.01); *B60W 2520/10* (2013.01); *B60W 2540/10* (2013.01);
(Continued)

(58) Field of Classification Search
CPC ....... B60W 10/06; B60W 10/08; B60W 10/30
See application file for complete search history.

(56) References Cited

U.S. PATENT DOCUMENTS

2001/0021683 A1    9/2001    Takagi et al.
2014/0297083 A1    10/2014   Okamoto

FOREIGN PATENT DOCUMENTS

JP    2001-253270 A    9/2001
JP    2011-213165 A    10/2011
(Continued)

*Primary Examiner* — Derek D Knight
(74) *Attorney, Agent, or Firm* — Osha Liang LLP

(57) ABSTRACT

A control device for a hybrid vehicle having an engine, a motor which drives by power of a battery, and an air conditioner which operates by power of the battery, includes a target driving force calculator configured to calculate a target value of driving three transmitted to a drive wheel from a driving source as target driving force, an air conditioner manager configured to manage an ON/OFF state of an air conditioner, and a controller configured to calculate a request output by adding the target driving force to a system output requested to the drive source by a system request, calculate an operation point of the engine for optimally driving the engine in response to the request output, control the engine to drive at the operation point, and control the motor based on the request output.

5 Claims, 7 Drawing Sheets

(51) Int. Cl.
  *B60W 10/06*   (2006.01)
  *B60W 10/30*   (2006.01)
  *B60W 20/13*   (2016.01)
  *B60K 6/543*   (2007.10)
  *B60K 6/547*   (2007.10)
  *B60W 10/08*   (2006.01)
  *B60W 10/26*   (2006.01)
  *B60W 30/18*   (2012.01)
  *B60W 20/10*   (2016.01)
  *F02D 29/04*   (2006.01)
  *F02D 29/06*   (2006.01)

(52) U.S. Cl.
  CPC .............. *B60W 2710/0677* (2013.01); *B60W 2710/086* (2013.01); *F02D 29/04* (2013.01); *F02D 29/06* (2013.01); *Y02T 10/6221* (2013.01); *Y02T 10/6286* (2013.01)

(56)      References Cited

FOREIGN PATENT DOCUMENTS

JP      2013-049324 A      3/2013
JP      2014-201100 A      10/2014

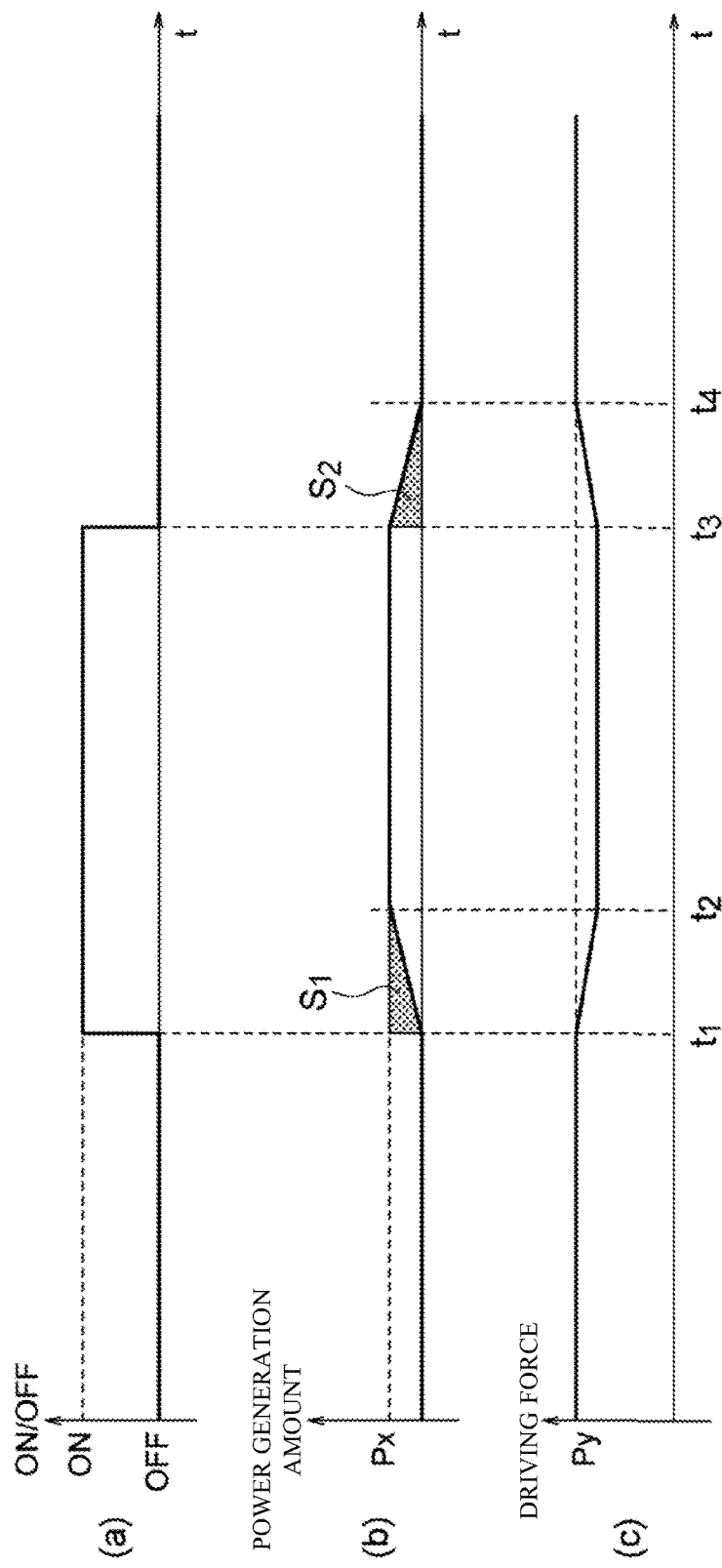

CONTROL DEVICE FOR HYBRID VEHICLE AND CONTROL METHOD

BACKGROUND

Technical Field

The present invention relates to a control device for a hybrid vehicle and its control method.

Related Art

As a conventional control device of a vehicle, a control device controls load of a power source based on a target output torque determined by calculating a target output of the power source based on the target driving force, calculating a target output rotation speed based on the target output, and calculating a target output torque of the power source for achieving the target driving force based on the target driving force. The control device calculates a target output ($P_2$) by adding an output torque ($P_{aux}$) for maintaining idling operation of the power source to a target output torque (P) and controls a load to the power source so that the output torque of the drive source to become the target output ($P_2$).

Patent Document 1: JP 2001-253270 A

SUMMARY

However, in the control device, when operating the air conditioner, the torque required for operating an air conditioner is added to the output torque of the power source, an equal output line of the target output is raised and thus the engine speed also becomes high. For this reason, engine rotation is fluctuated by an operation of the air conditioner.

One or more embodiments of the present invention may suppress fluctuation in the engine speed due to operation of an air conditioner.

In one or more embodiments of the present invention, a target value for a driving force transmitted to a drive wheel from a drive source is calculated as a target driving force. Then, a request output is calculated by adding the target driving force to an system output requested to a drive source by a system request and an operation point for an engine is calculated for optimally driving an engine in response to the request output for controlling the engine to drive at the operation point. Also, in one or more embodiments of the present invention, when an air conditioner is in an ON state, a driving force which corresponds to electric power consumption consumed by the air conditioner is subtracted from the target driving force and the request output is calculated by adding an engine output required to generate the power consumption by a motor to the system output.

According to one or more embodiments of the present invention, when the air conditioner becomes an On state, driving force which corresponds to the electric power consumption consumed by the air conditioner is subtracted from the target driving force and the engine output which corresponds to the subtracted driving force is added to the output requested to the system, and thus an operation point of the engine does not greatly vary depending on the operation of the air conditioner. As a result, fluctuation of an engine speed due to operation of the air conditioner can be suppressed.

BRIEF DESCRIPTION OF THE DRAWINGS

FIG. 7 show graphs to describe a time chart in relation to ON/OFF of the electric air conditioner, the amount of power generation, and driving force. Graph (a) is a graph illustrating characteristics of ON/OFF of the electric air conditioner, graph (b) is a graph illustrating characteristics of power generation amount, and graph (c) is a graph illustrating driving force characteristics.

DETAILED DESCRIPTION

In the following, embodiments of the present invention are explained with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
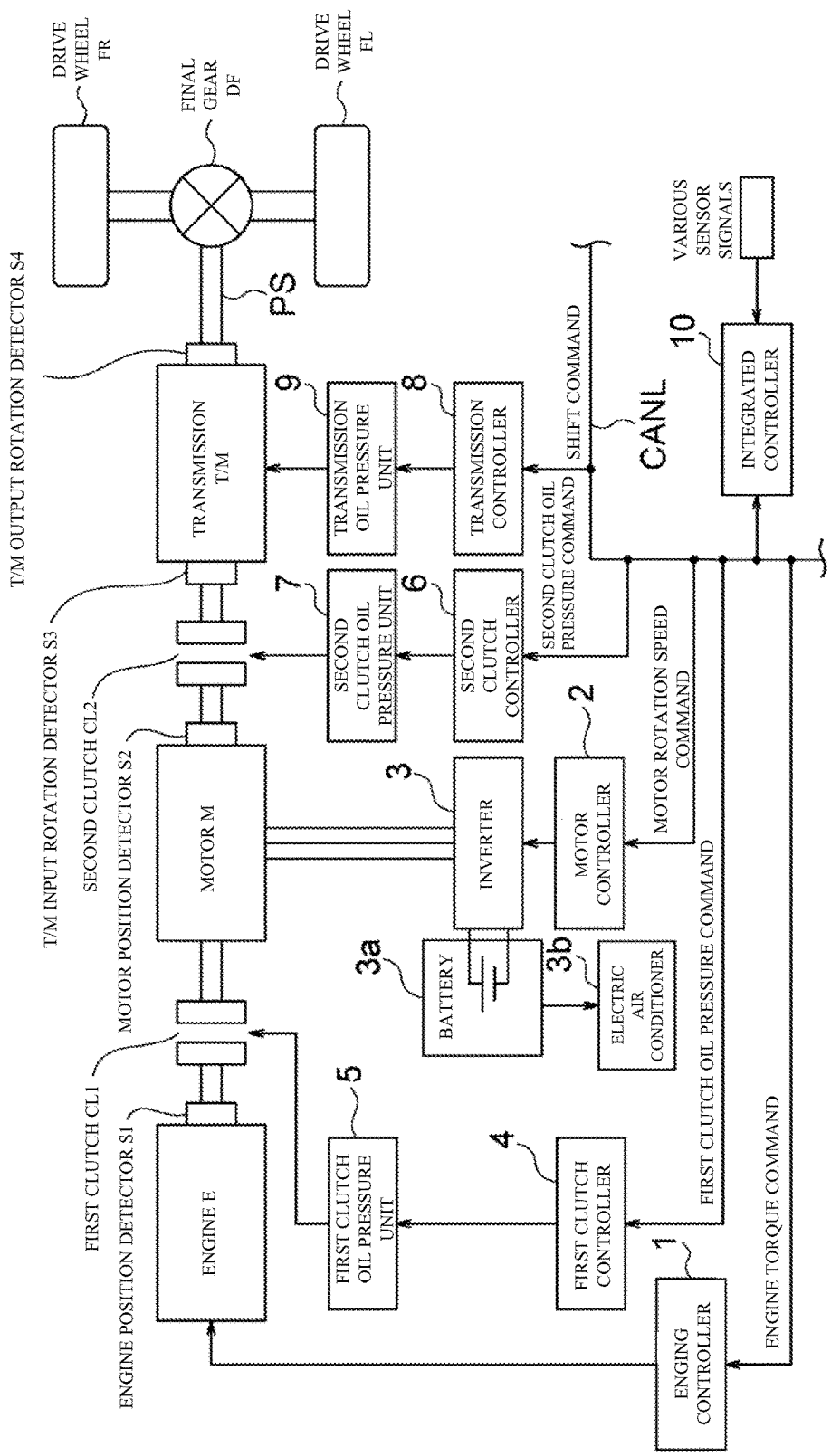
FIG. 1 is a block diagram illustrating an entire configuration of a hybrid vehicle according to one or more embodiments of the present invention.

FIG. 1 is a block diagram illustrating the entire configuration of a hybrid vehicle including a control device for a hybrid vehicle according to one or more embodiments of the present invention. As shown in FIG. 1, the hybrid vehicle 100 includes an engine E, a motor M, a first clutch CL1, a second clutch CL2, and a transmission T/M. The hybrid vehicle 100 includes a propeller shaft PS, a final gear (differential) DF, a left front wheel FL (drive wheel), and a right front wheel FR (drive wheel). The engine E and motor M are the drive sources of the hybrid vehicle. Further, the hybrid type of the hybrid vehicle 100 is not limited to a parallel type and it may be a series type.

The engine E is, for example, a gasoline engine or diesel engine, etc. The engine E controls an valve opening of a throttle valve based on a control command from an engine controller 1 described below. Note that, for an output shaft of the engine E, an engine position detector S1 that detects engine speed is arranged.

The motor M is such as a synchronous motor generator made by embedding a permanent magnet to a rotor and winding a stator coil to a stator. Also, the motor M operates by electric power from the a battery 3a. An inverter 3 drives by a control command from a motor controller 2 described later, converts the electric power from the battery 3a, and outputs three-phase AC power to the motor M.

The rotor (output shaft) of the motor is connected to the input shaft of the transmission T/M via the second clutch CL2. Accordingly, the motor M operates as an electric motor for rotationally driving the drive wheels FL and FR upon receipt of electric power supply from the inverter 3. More, when the rotor is rotating by an external force during braking, the motor M functions as a power generator (generator) to generate an electromotive force to both ends of the stator coil and charges the battery 3a (regeneration). To the output shaft of the motor M, a motor position detector S2 is arranged for detecting a motor rotation speed.

The electric air conditioner 3b operates by electric power from the battery 3a. A compressor of the electric air conditioner 3b is not connected to the engine with a belt like in a gasoline vehicle that only has an engine as the drive source but uses the battery 3b as its power source. Further, as to the electric air conditioner 3b, not only the compressor but also other components included in the electric air conditioner 3b consume the electric power of the battery 3a to operate the electric air conditioner 3b. For this reason, when the electric air conditioner 3b is operated, power consumption of by the battery 3b greatly changes The first clutch CL1 includes such as a hydraulic single-disk clutch interposed between the engine E and motor M. The first clutch CL1 performs fastening-releasing operation including slip-fastening (slipping) and slip-releasing by the control oil pressure generated by a first clutch oil pressure unit 5 based on a control command from a first clutch controller 4 described later.

The second clutch CL2 includes such as a hydraulic multi-disk clutch interposed between the motor M and the transmission T/M. The second clutch CL2 performs fastening-releasing operation including slip-fastening and slip-releasing by the control oil pressure generated by the second clutch oil pressure unit 7 based on the control command from a second clutch controller 6 described later.

The torque capacity of the first clutch CL1 and the torque capacity of the second clutch CL2 may change continuously according to the supplied oil pressure. Also, the first clutch oil pressure unit 5 and the second clutch oil pressure unit 7 generate control oil pressure by an oil pressure circuit including the control valve not shown in the drawings. Then, by variably controlling the control oil pressure, the torque capacity of the first clutch CL1 and the torque capacity of the second clutch CL2 can be continuously changed.

The transmission T/M is a transmission that automatically switches the transmission gear ratio of stepped control, for example, "five forward stages and one backward stage" and "six forward stages and one backward stage", etc., and continuously variable transmission (CVT) gear ratio according to the driving state such as the speed of the vehicle, an accelerator opening, etc. An output shaft of the transmission T/M is connected to right and left front wheels (drive wheels), or FL and FR, via a propeller shaft PS and final gear DF. The transmission T/M performs an gear shift operation by the control oil pressure generated by a transmission oil pressure unit 9 based on the control command from a transmission controller 8. An input shaft of the transmission T/M includes a T/M input rotation detector S3 for detecting the input rotation speed. An output shaft of the transmission T/M includes a T/M output rotation detector S4 for detecting output rotation speed.

Next, a control device of the hybrid vehicle 100 is explained. The control device includes an engine controller 1, a motor controller 2, an inverter 3, a battery 3a, a first clutch controller 4, a first clutch oil pressure unit 5, a second clutch controller 6, a second clutch oil pressure unit 7, a transmission controller 8, a transmission oil pressure unit 9, and an integrated controller 10 as shown in FIG. 1. Additionally, the engine controller 1, the motor controller 2, the first clutch controller 4, the transmission controller 8, and the integrated controller 10 are connected with CAN communication line L to enable exchange of information.

To the engine controller 1, engine speed information is input from an engine speed sensor not shown in the drawings. In response to a target engine torque command from the integrated controller 10, the engine controller 1 outputs a command for controlling an engine operation point, for example, to a throttle valve actuator not shown in the drawings. Further, the engine speed information is supplied to the integrated controller 10 through the CAN communication line L.

To the motor controller 2, information is input from the motor position detector S2 that detects rotor rotation position of the motor M. In the response to a target motor rotation speed command from the integrated controller 10, the motor controller 2 outputs a command for controlling the motor rotation speed of the motor M to the inverter 3.

The first clutch controller 4 inputs sensor information from a clutch oil pressure sensor and clutch stroke sensor, etc., not shown in the drawings. Then, the first clutch controller 4 outputs, in response to the first clutch oil pressure command from the integrated controller 10, a command to control fastening, slipping (slip-fastening), and releasing of the first clutch CL1, to the first clutch oil pressure unit 5.

To the second clutch controller 6, sensor information from a clutch oil pressure sensor and clutch stroke sensor, etc., not shown in the drawings is input. The second controller 6 outputs, in response to the second clutch control command from the integrated controller 10, a command to control fastening, slipping (slip-fastening), and releasing of the second clutch CL2 to the second clutch oil pressure unit 7.

To the transmission controller 8, sensor information from an accelerator opening sensor (not shown in the drawings) that detects opening of the accelerator operated by a driver and vehicle speed sensor is input. Then, the transmission controller 8, in response to a shift command from the integrated controller 10, outputs a command to control the transmission oil pressure to the transmission oil pressure unit 9.

The transmission oil pressure unit 9 includes an actuator, an oil pressure circuit, and a control valve, which are not shown in the drawings. More, the transmission oil pressure unit 9 generates a predetermined control oil pressure on a basis of a control command from the transmission controller 8 and the transmission oil pressure unit 9 performs a gear shift operation (up shifting and down shifting) of the transmission T/M in accordance with the control oil pressure.

The integrated controller 10 manages energy consumed by the entire vehicle 100, and in order to drive the vehicle at its maximum efficiency, controls the motor M and engine E, etc. To the integrated controller 10, various sensor signals from an engine position detector S1, a motor position detector S2, a T/M input rotation detector S3, and a T/M input rotation detector S4, etc., and various types of information obtained via the CAN communication line are input.

Then, the integrated controller 10 performs operation control of the engine E by a control command sent to the engine controller 1, and performs operation control (motor output torque and motor output speed) of the motor M by a control command sent to the motor controller 2. Also, the integrated controller 10 performs fastening, slipping, and releasing controls for the first clutch CL1 by an oil pressure control command sent to the first clutch controller 4, and fastening, slipping, releasing controls for the second clutch CL2 by an oil pressure control command sent to the second clutch controller 6. The integrated controller 10 controls the transmission oil pressure unit 9 by sending a transmission control command to the transmission controller 8.

Figure 2:
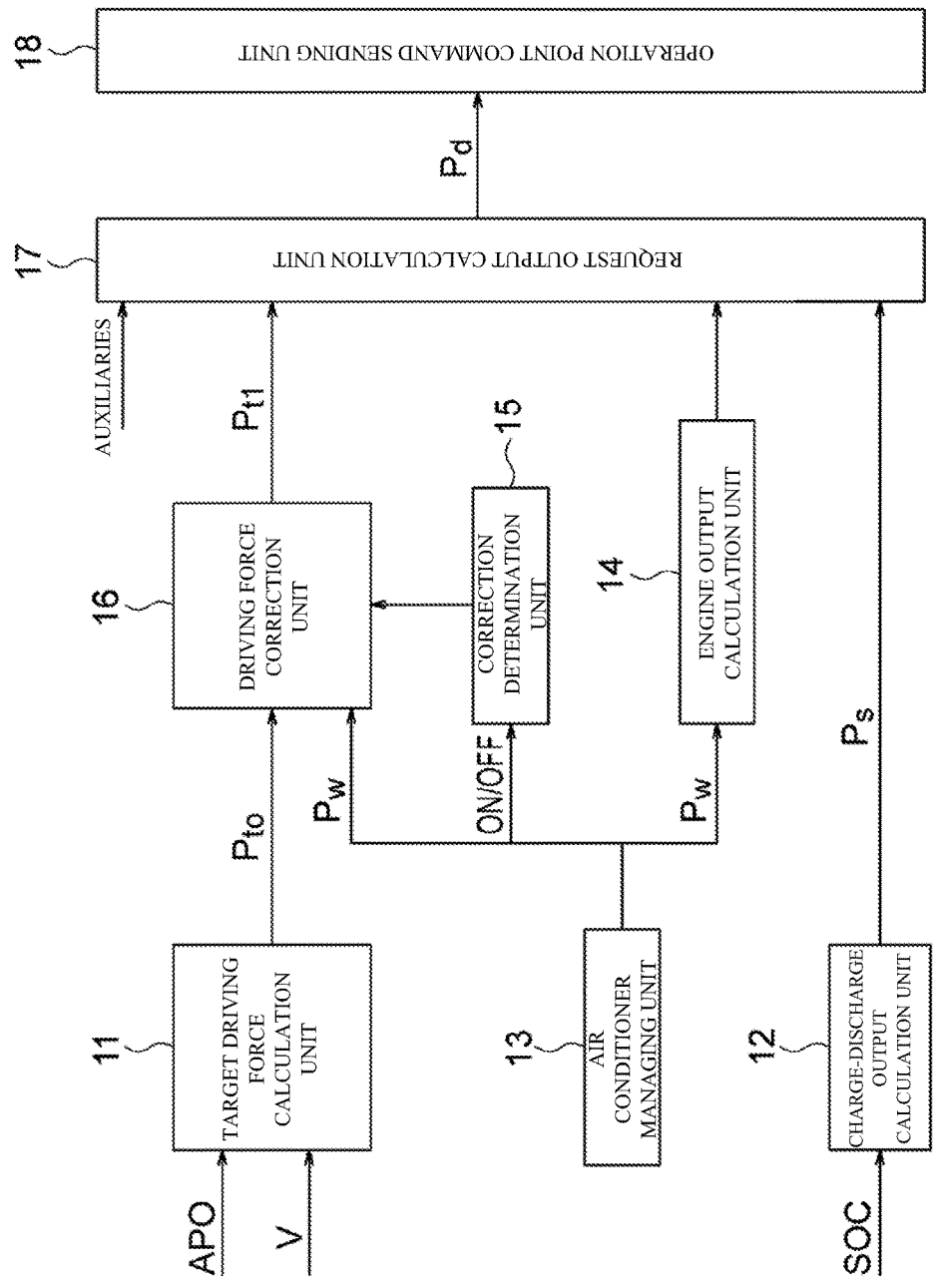
FIG. 2 is a block diagram illustrating a configuration of an integrated controller in FIG. 1.

Next, the configuration of the integrated controller 10 is explained. FIG. 2 is a block diagram illustrating the configuration of the integrated controller 10. The integrated controller 10 is configured from a CPU, ROM, etc., and includes the following structures as a function block of various types of functions executed by the CPU, etc. The integrated controller 10 includes a target driving force calculation unit 11, a charge-discharge output calculation unit 12, an air conditioner managing unit 13, an engine output calculation unit 14, a correction determination unit 15, a driving force correction unit 16, a request output calculation unit 17, and an operation point command sending unit 18. Additionally, the configuration of the integrated controller 10 is not limited to the configuration shown in FIG. 2 and includes other configuration for the vehicle control.

The target driving force calculation unit 11 calculates a target driving force ($P_{ro}$) based on an accelerator opening (APO) and vehicle speed (V). The target driving force is a target value of the driving force transmitted to the drive wheels PR and PL from the drive source. In other words, the target driving force is the target value for traveling with the driving force requested by a driver such as by an operation of an accelerator or the like which are operated by the driver. To the target driving force calculation unit 11, a map indicating correlation between an accelerator opening, vehicle speed, and a target driving force is recorded in advance. Then, the target driving force calculation unit 11 calculates a target driving force ($P_{ro}$) by referencing the map to an input of an accelerator opening (APO) and vehicle speed (V).

The charge-discharge output calculation unit 12 calculates a charge-discharge output based on an SOC of the battery 3a. The charge-discharge output is an output of the engine E or an input and output of the motor M required when charging or discharging the battery by a system request. In other words, the charge-discharge output is an output (system output) requested to a drive source by a system request. The SOC is a value indicating a charge state of the battery 3a and is input to the charge-discharge output calculation unit 12 from a battery controller not shown in the drawings. In order to avoid battery 3a to become a overdischarge state or overcharge state, an appropriate SOC range is set in advance. When a present SOC of the battery 3a is higher than the appropriate range of SOC, the charge-discharge output calculation unit 12 calculates an output of the motor M so as to discharge the battery 3a. On the other hand, when the present SOC of the battery 3a is lower than the appropriate range of SOC, the charge-discharge output calculation unit 12 calculates an output of the engine E (driving force of the engine) so as to charge the battery 3a. Then, the charge-discharge output calculation unit 12 calculates a charge-discharge output ($P_s$) from the power of the engine E or motor M so that the SOC of the battery 3a is within the appropriate range.

The air conditioner managing unit 13 manages an operating state of the electric air conditioner 3b and electric power consumption consumed by the electric air conditioner 3b. The operating state of the electric air conditioner 3b indicates an ON/OFF state of the electric air conditioner 3b and set temperature of the air conditioner, etc. When ON/OFF state of the electric air conditioner 3b is switched by an occupant, the air conditioner managing unit 13 outputs an ON/OFF switching signal of the electric air conditioner 3b to the correction determination unit 15. Also, the air conditioner managing unit 13 calculates power consumption ($P_w$) consumed by the electric air conditioner 3b from outside air temperature and set temperature of the electric air conditioner 3b, etc., and outputs information of the power consumption ($P_w$) to the driving force correction unit 16 and engine output calculation unit 14. More, since the electric air conditioner 3b uses the battery 3a as its power source, power consumption consumed by the electric air conditioner 3b corresponds to the electric power consumption consumed by the battery 3a.

The engine output calculation unit 14 calculates an engine output ($P_E$) required to generate power consumption ($P_w$) consumed by the electric air conditioner 3b at the motor M. The engine output ($P_E$) corresponds to the amount of power generated by the motor M when the motor M is operated as a power generator by driving the engine E and is equal to the output torque of the engine E.

The correction determination unit 15 determines whether or not to correct a target driving force ($P_{ro}$) based on the present vehicle speed and accelerator opening of the vehicle. Also, the correction determination unit 15 determines whether or not to correct the target driving force ($P_{ro}$) based on the operation mode of the hybrid vehicle. The correction determination unit 15 determines whether or not to perform the correction when the electric air conditioner 3b is in a ON state. The determination result by the correction determination unit 15 is output to the driving force correction unit 16.

The driving force correction unit 16 corrects the target driving force ($P_{ro}$) in accordance with the determination result determined by the correction determination unit 15 and outputs the corrected target driving force ($P_{r1}$) to the request output calculation unit 17. When the correction determination unit 15 determines to correct the target driving force ($P_{ro}$), the driving force correction unit 16 calculates a correction amount of the target driving force ($P_{ro}$). The correction amount is a value obtained by converting the electric power (output from the battery 3a) required to operate the electric air conditioner 3b to the driving force of the drive source. In other words, the correction amount is the driving force that corresponds to the power consumption consumed by the electric air conditioner 3b. Further, the driving force correction unit 16 corrects the target driving force ($P_{ro}$) by subtracting the correction amount from the target driving force ($P_{ro}$).

When the correction determination unit 15 determines not to correct the target driving force ($P_{ro}$), the driving force correction unit 16 outputs the target driving force ($P_{ro}$) as the target driving force ($P_a$) to the request output calculation unit 17 without correction.

The request output calculation unit 17 calculates a request output ($P_d$) by adding the target driving force ($P_a$), charge-discharge output ($P_s$), and auxiliary output ($P_a$). The auxiliary output corresponds to the driving force requested by the drive source in order to operate auxiliaries. For example, when starting travel of a vehicle, an auxiliary output is the power required for vehicle travel. The request output calculation unit 17 calculates the auxiliary output in accordance with kinds of the auxiliaries to be operated. To the auxiliaries, for example, an oil pump is included. The request output is an output requested to a drive source in order to satisfy a drive request based on the accelerator operation by the driver and system request. When the electric air conditioner 3b is in a ON state, because an engine output ($P_E$) is input from the engine output calculation unit 14, the request output calculation unit 17 calculates the request output ($P_d$) by adding the engine output ($P_E$) to the output obtained by adding the target driving force ($P_{t1}$), charge-discharge output ($P_s$), and auxiliary output ($P_a$). The request output calculation unit 17 outputs the request output ($P_d$) to the operation point command sending unit 18.

The operation point command sending unit 18 calculates each of an operation point of the engine E and an operation point of the motor M in order to output request output ($P_d$) from the drive source. The operation point of the engine E is indicated with an engine torque and engine speed and is an operation point for outputting the request output to the engine from the engine E in a good fuel-efficiency state. Then, the operation point command sending unit 18 calculates a torque command of the engine E from the present rotation speed of the engine E and operation point of the engine E, and outputs the command to the engine controller 1. The operation point command sending unit 18 calculates a rotation speed command of the motor M based on the present rotation speed of the motor M so as to drive the motor M at the operation point and outputs the command to the motor controller 2. Also, the operation point command sending unit 18 outputs such as a shift command so that the request output ($P_d$) is output from the drive source.

Figure 3:
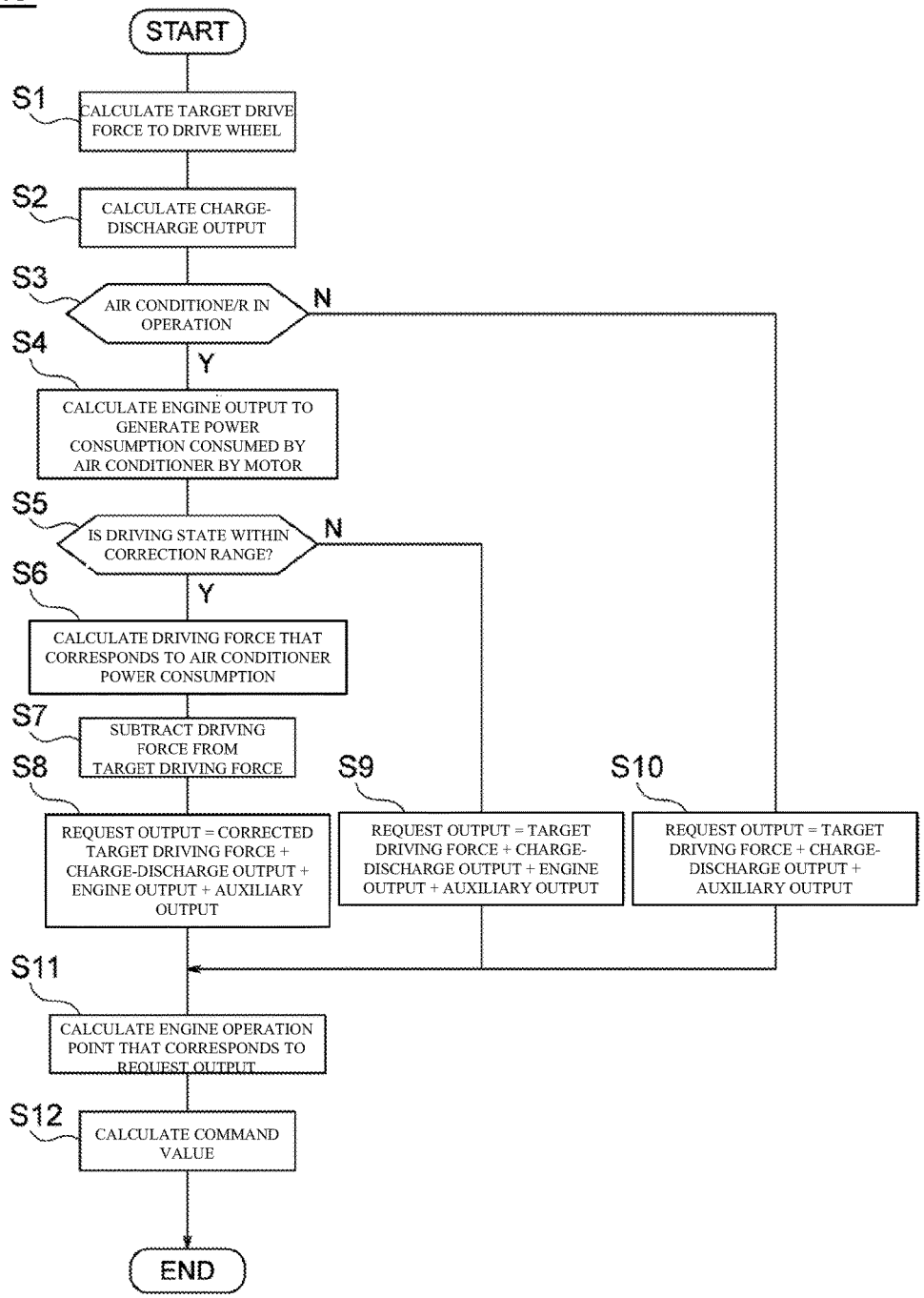
FIG. 3 is a flowchart illustrating a control flow of the integrated controller of FIG. 2.
Figure 4:
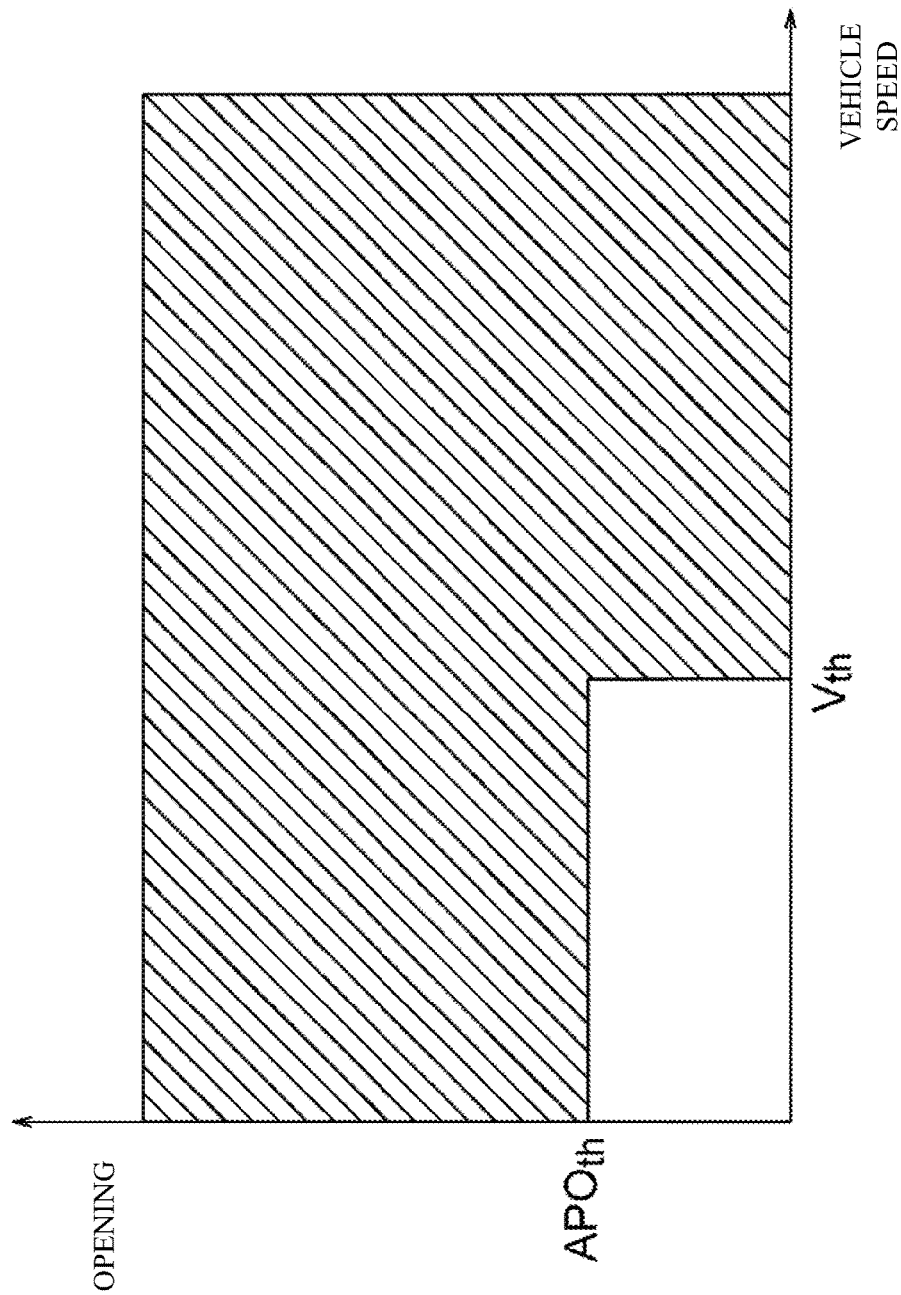
FIG. 4 is a graph illustrating a range to which a correction is performed concerning the speed and accelerator opening of a vehicle.
Figure 5:
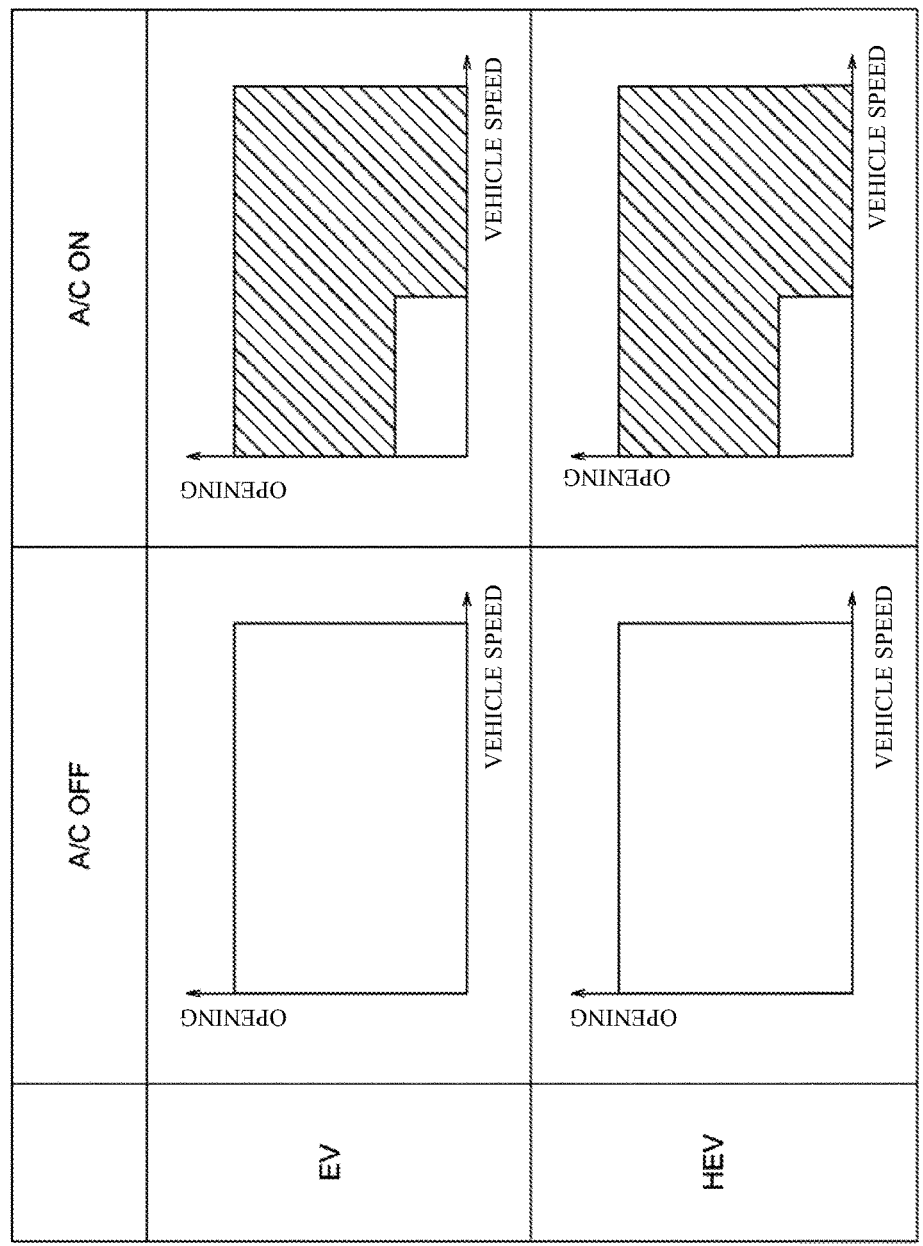
FIG. 5 is a graph illustrating a range to which a correction is performed concerning ON/OFF of an air conditioner and a traveling mode of the vehicle.

In the following, with reference to FIG. 3 to FIG. 5, control flow of the integrated controller 10 is explained. FIG. 3 is a flowchart illustrating a control flow of the integrated controller 10. FIG. 4 is a graph illustrating a correction range in which correction is performed concerning the speed of a vehicle and accelerator opening. FIG. 5 is a graph illustrating a correction range in which a correction is performed concerning ON/OFF of an air conditioner and a traveling mode of the vehicle. Additionally, the integrated controller 10 repeats the following control flow in a predetermined cycle.

In step S1, the target driving force calculation unit 11 calculates a target driving force ($P_{t0}$) to the drive wheel. In step S2, the charge-discharge output calculation unit 12 calculates a charge-discharge output ($P_s$) by a system request. In step S3, the air conditioner managing unit 13 determines whether or not the electric air conditioner 3b is in operation. When the electric air conditioner 3b is in operation, in step S4, the engine output calculation unit 14 calculates an engine output ($P_E$) based on the power consumption consumed by the electric air conditioner 3b.

In step S5, the correction determination unit 15 determines whether or not the drive state of the vehicle is within a correction range. The driving state of the vehicle is indicated by vehicle speed and accelerator opening of the vehicle. The correction range is the range in which the target driving force ($P_{t0}$) is corrected by the driving force correction unit 16. To the correction determination unit 15, a threshold value for indicating a correction range is set in advance. The threshold value is set by a threshold value for the vehicle speed of the vehicle ($V_{th}$) and a threshold value ($APO_{th}$) of the accelerator opening. Then, the correction range is the range in which the vehicle speed of the vehicle is the vehicle speed threshold value ($V_{th}$) or more or in which the accelerator opening is the opening threshold value ($APO_{th}$) or more. The range in which the vehicle speed of the vehicle is less than the vehicle speed threshold value ($V_{th}$) and also in which the accelerator opening is less than the opening threshold value ($APO_{th}$) is excluded from the correction range. The no correction range is a range in which a creeping state of the vehicle is shown in vehicle speed and accelerator opening. In other words, when the driving state is in a creeping state, correction of the target driving force ($P_{t0}$) is not performed. In FIG. 4, the correction range is shown with oblique lines.

The correction determination unit 15 determines that the driving state is within a correction range when the present vehicle speed is the vehicle speed threshold value ($V_{th}$) or more, or when the present accelerator opening is the opening threshold value ($APO_{th}$) or more. On the other hand, the correction determination unit 15 determines that the driving state is out of the correction range when the present vehicle speed is less than the vehicle speed threshold value ($V_{th}$) and when the present accelerator opening is less than the opening threshold value ($APO_{th}$).

Now, the relationship of the correction range between the operating state of the electric air conditioner 3b and drive mode is described with reference to FIG. 5. As shown in FIG. 5, the correction range is similarly set for the cases in which the drive mode of the vehicle is an HEV mode and in which the drive mode of the vehicle is the EV mode. Accordingly, when the electric air conditioner 3b is in a ON state and when the driving state is within a correction range, a target driving force ($P_t$) is corrected when the drive mode is the HEV mode, and the target driving force ($P_t$) is also corrected when the drive mode is in the EV mode. In this way, for example, when a drive range is within a correction range and when the drive mode is switched from the HEV mode to EV mode, or when the drive mode is switched from the EV mode to the HEV mode, a state of correcting the target driving force ($P_t$) will be maintained. Further, when the drive range is out of the correction range and when the drive mode is switched from the HEV mode to the EV mode, or when the drive mode is switched form the EV mode to the HEV mode, a state in which the correction is not performed for the target driving force ($P_t$) is maintained.

On the other hand, when the electric air conditioner 3b is in the OFF state, the correction range is not set. Accordingly, when the electric air conditioner 3b is in the OFF state, the target driving force ($P_t$) is not corrected.

When the driving state is determined to be within the correction range by the determination in step S5, the driving force correction unit 16 calculates a driving force of the drive source which corresponds to the power consumption consumed by the electric air conditioner 3b in step S6. In step S7, the driving force correction unit 16 corrects the target driving force ($P_{t0}$) by performing subtraction processing. The driving force correction unit 16 subtracts the calculated driving force from the target driving force ($P_{t0}$) as the subtraction processing. In step S8, the request output calculation unit 17 calculates the auxiliary output ($P_a$) and by adding the corrected target driving force ($P_{t1}$), charge-discharge output ($P_s$), engine output ($P_E$) and auxiliary output ($P_a$), calculates a request output ($P_d$). In other words, the request output calculation unit 17 calculates the request output ($P_d$) by adding the engine output ($P_E$) to the charge-discharge output ($P_s$), and further adding the target driving force ($P_{t1}$) after correction and auxiliary output ($P_a$).

From the determination in step S5, when the driving state is determined to be outside the correction range, the request output calculation unit 17 calculates an auxiliary output ($P_a$) in step S9 and by adding the target driving force ($P_{t0}$), charge-discharge output ($P_s$), engine output ($P_E$), and auxiliary output ($P_a$), calculates the request output ($P_d$). In this way, the request output calculation unit 17 calculates the request output ($P_d$) by adding the engine output ($P_E$) to the charge-discharge output ($P_s$) and further adding the target driving force ($P_{t1}$) to which the subtraction processing is not performed and the auxiliary output ($P_a$).

From the determination in step S3, when the air conditioner is determined to be stopped, the request output calculation unit 17 calculates the auxiliary output ($P_a$) in step S10 and by adding the target driving force ($P_{t0}$), charge-discharge output ($P_s$), and auxiliary output ($P_a$), calculates a request output ($P_d$).

In step S11, the request output calculation unit 17 calculates an operation point which corresponds to the calculated request output. In step S12, the operation point command sending unit 18 calculates such of a torque command value for engine E so as to operate engine E and/or motor M at the operation point and outputs the result to the engine controller 1, etc.

Figure 6:
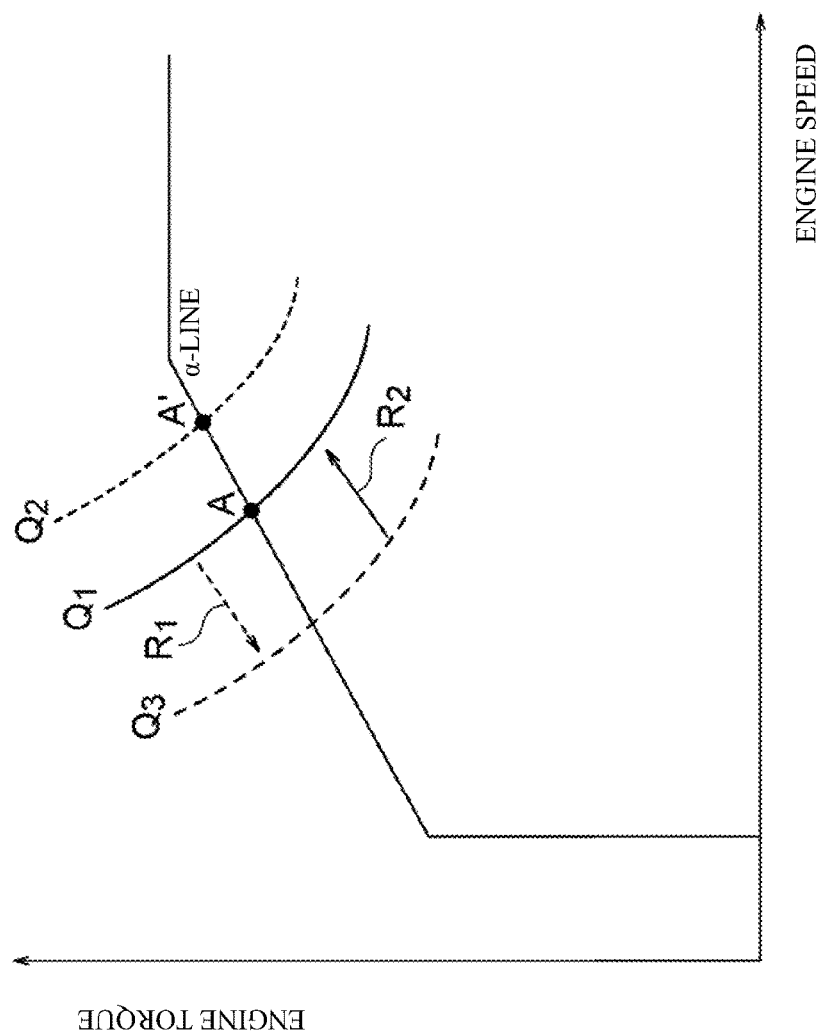
FIG. 6 is a graph illustrating an equal output line of an a-line and request outputs.

Next, a relationship between the request output calculated by the integrated controller 10 and the engine operation point is described using FIG. 6. FIG. 6 is a graph illustrating an equal output line of an a-line and request outputs. The horizontal axis of FIG. 6 shows the rotation speed and the vertical axis shows the torque of the engine E.

When the electric air conditioner 3b is in an OFF state, the request output becomes a value to which a target driving force ($P_{t1}$) and charge input and output ($P_s$) are added. The target driving force ($P_{t1}$) is not corrected by the driving force correction unit 16, and is the value same as the target driving force ($P_{t0}$). Then, from the request output at the point, the output requested to the engine E is represented with an equal output line of graph $Q_1$. An operation point of the engine E with respect to the request output of the engine E is represented by an intersection point (point A) with the a-line. Further, a-line is the line that connects the operation points at which the output efficiency of the engine E is high.

Assume that the electric air conditioner 3b is switched from an OFF state to an ON state in a state in which the engine E is driving at the operation point A. In order to consume electric power of the battery 3a, the electric air conditioner 3b needs to drive the engine E and generate power in the motor M for the power amount consumed by the battery 3a. Different from the control according to one or more embodiments of the present invention, when the target driving force ($P_O$) is raised in order to make up the power generated by the motor without changing the input and output of the drive source requested to the system, the request output is raised and the request output of the engine E becomes the output on the graph $Q_2$ that is higher than the output on the graph $Q_1$. More, the operation point A of the engine E becomes the operation point A' (an intersection point of the equal output line $Q_2$ and the a-line). In other words, when the electric air conditioner 3b becomes an ON state, the request output to the engine E becomes high and by switching of the electric air conditioner 3b from OFF to ON, the rotation speed of the engine E increases.

Further, when the electric air conditioner 3b is to be switched from an ON state to an OFF state in a state where the amount of power generated by the motor that corresponds to power consumption consumed by the electric air conditioner 3b is added to the target driving force, the amount of power generated by the motor M that corresponds to the power consumption consumed by the electric air conditioner 3b becomes unnecessary. Accordingly, the driving force that corresponds to the amount of generated power is no longer added to the target driving force and thus the target driving force lowers and the request output to the engine E also decreases. For this reason, the rotation speed of the engine E lowers due to switching of the electric air conditioner 3b from ON to OFF. That is, when the control that is different from above is performed, a rotation fluctuation is generated to the engine by the operation of the air conditioner.

Next, an operation point of the engine E in the control of one or more embodiments of the present invention is described. As above, the output requested to the engine E when the electric air conditioner 3b is in an OFF state is represented by the equal output line of graph $Q_1$ and the operation point of the engine E is represented by the point A on the graph $Q_1$. Then, suppose that the electric air conditioner 3b is switched from an OFF state to an ON state. In one or more embodiments of the present invention, a driving force that corresponds to the power consumption consumed by the electric air conditioner 3b is subtracted from the target driving force. By this subtraction processing to the target driving force, the request output to the engine E lowers from the graph $Q_1$ to graph $Q_3$. (corresponds to an arrow $R_1$ in FIG. 6). Then, in one or more embodiments of the present invention, an engine output ($P_E$) required to generate power consumption consumed by the electric air conditioner 3b in the motor M is added to the output requested by the system. As a result, the request output to the engine E becomes high for the amount of the driving force which is subtracted by the subtraction processing to the target driving force, and the request output to the engine E increases from the graph $Q_3$ to the graph $Q_1$. (corresponds to an arrow $R_2$ in FIG. 6). In other words, in one or more embodiments of the present invention, request output to the engine E does not change even when the electric air conditioner 3b is changed from the OFF state to the ON state, and the operation point for the engine E becomes the point A. Accordingly, rotation speed of the engine E does not change greatly and is kept stable.

Additionally, when the electric air conditioner 3b switches from the ON state to the OFF state, correction by the subtraction processing to the target driving force becomes unnecessary and thus the target driving force is raised. However, since the engine output ($P_E$) becomes zero, the request output to the engine E does not change even when the electric air conditioner 3b is switched from ON to OFF and the operation point for the engine E keeps the point A. Accordingly, rotation speed of the engine E is not changed greatly but kept stable. In other words, in one or more embodiments of the present invention, fluctuation in the engine rotation due to operation of the air conditioner (rotation fluctuation) can be suppressed.

FIG. 7 shows a time chart when the electric air conditioner 3b switches from the OFF state to the ON state and then the electric air conditioner 3b switches from the ON state to the OFF state. FIG. 7 is a graph for describing a time chart, where graph (a) is a graph showing switching between ON and OFF of the electric air conditioner 3b, graph (b) is a graph showing characteristics of the power generation amount of the motor M, and graph (c) is a graph showing characteristics of the driving force transmitted to the drive wheels FR and FL.

At time $t_1$, the electric air conditioner 3b switches from an OFF state to an ON state. Along with this switching of the electric air conditioner 3b from OFF to ON, in order to generate power for the amount consumed by the electric air conditioner 3b in the motor M, the power generation amount of the motor M becomes high. At this point, when the power generation amount of the motor M is rapidly raised (raised so as to create a pulse), a decrease amount in the driving force transmitted to the driving wheels FR and FL increases and there is a risk that an occupant of the vehicle feels uncomfortable. For this reason, when generating the power that corresponds to the power consumption consumed by the electric air conditioner 3b in the motor M, the power generation amount by the motor M is raised gradually.

In one or more embodiments of the present invention, for a certain period of time starting from the switching of the electric air conditioner 3b from the OFF state to the ON state (corresponds to the time period between time $t_1$ and time $t_2$ in FIG. 7), in order to gradually raise the power generation amount of the motor M, limitation is applied to the change rate of the driving force when performing subtraction processing of the target driving force. Specifically, the driving force correction unit 16 gradually increases the subtraction amount along with elapse of time when subtracting the driving force of the drive source that corresponds to the power consumption (power generation amount of the motor M) consumed by the electric air conditioner 3*b* from the target driving force. Then, the driving force correction unit 16 performs subtraction processing in a manner so as to make the subtraction amount equal to the power consumption consumed by the electric air conditioner 3*b* (the power generation amount ($P_x$) of the motor M) at the time $t_2$. Also, the engine output calculation unit 14, by corresponding to the change rate limitation of the driving force by the driving force correction unit 16, limits the change rate of the engine output ($P_E$). Specifically, to the power consumption consumed by the electric air conditioner 3*b*, the engine output calculation unit 14 gradually increases the engine output ($P_E$) along with elapse of time. Then, the engine output calculation unit 14 calculates the engine output ($P_E$) so that the engine output ($P_E$) is equal to the power consumption (the power generation amount of the motor M) consumed by the electric air conditioner 3*b* at the time $t_2$.

In this way, as shown in graph (b) in FIG. 7, the power generation amount of the motor M between the time $t_1$ to time $t_2$ gradually increases in a predetermined inclination. Along with the change in power generation amount, the subtraction amount from the target driving force ($P_{t1}$) and engine output ($P_E$) also increase gradually in a predetermined inclination. Further, as the subtraction amount of the target driving force ($P_{t0}$) increases in a predetermined inclination, the driving force of the drive wheels gradually decreases as shown in graph (c) in FIG. 7, and the driving force becomes smaller than $P_y$ (see graph (c) in FIG. 7). In this way, when switching the electric air conditioner 3*b* from OFF to ON, the driving force can be controlled in a way to avoid the occupant from feeling uncomfortable (shock). Between the time $t_1$ and time $t_2$, although the power generation amount by the motor M becomes smaller than the power consumption (power consumption amount) consumed by the electric air conditioner 3*b*, a shortage in the power generation amount of the motor M (corresponds to the range shown as $S_1$ in graph (b)) can be covered by discharge of the battery 3*a*.

Next, at time $t_3$, electric air conditioner 3*b* is switched from an ON state to an OFF state. Along with this switching of the electric air conditioner 3*b* from ON to OFF, power generation by the motor M to supply the power for the amount consumed by the electric air conditioner 3*b* becomes unnecessary. At this point, when the power generation amount by the motor M is rapidly made small, the amount of increase in the driving force transmitted to the drive wheels FR and FL becomes large and may lead to discomfort to the occupant of the vehicle. For this reason, when making power generation by the motor M for supplying the power consumption consumed by the electric air conditioner 3*b* to zero, power generation amount of the motor M is gradually reduced.

In one or more embodiments of the present invention, in order to gradually reduce power generation amount of the motor M, for a certain period of time from the point of time at which the electric air conditioner 3*b* is switched from the ON state to the OFF state (corresponds to the time period between time $t_3$ to time $t_4$ in FIG. 7), a limitation is performed to the change rate for the driving force when releasing the subtraction processing to the target driving force. Specifically, the driving force correction unit 16 reduces the driving force of the drive source that corresponds to the power consumption (the power generation amount by the motor M) consumed by the electric air conditioner 3*b* and gradually increases the increase amount along with elapse of time when increasing the target driving force. Then, the driving force correction unit 16 calculates the target driving force ($P_u$) as the target driving force ($P_{t0}$) so that the amount of increase at the point of time $t_4$ corresponds to the subtraction amount in the subtraction processing. Also, the engine output calculation unit 14, in correspondence with the change rate of the driving force in the driving force correction unit 16, limits the change rate of the engine output ($P_E$). Specifically, the engine output calculation unit 14 gradually reduces the engine output ($P_E$), which corresponds to the power consumption consumed by the electric air conditioner 3*b*, along with the elapse of time. Then, the engine output calculation unit 14 calculates the engine output ($P_E$) so that the engine output ($P_E$) becomes zero at the time $t_4$.

As shown in graph (b) of FIG. 7, the power generation amount of the motor M from the time $t_3$ to time $t_4$ gradually decreases in a predetermined inclination. Along with the change in power generation amount, the increase amount of the target driving force ($P_u$) gradually increases in a predetermined inclination and engine output ($P_E$) gradually decreases in a predetermined inclination. Further, as the target driving force ($P_{t1}$) increases in a predetermined inclination, the driving force of the drive wheels gradually increases as shown in graph (c) in FIG. 7, and becomes $P_y$. In this way, when switching the electric air conditioner 3*b* from ON to OFF, to avoid the occupant from feeling uncomfortable (shock), the driving force can be controlled. Between the time $t_3$ and time $t_4$, although the power generation amount by the motor M becomes larger than the power consumption (power consumption amount) consumed by the electric air conditioner 3*b*, an excess in the power generation amount of the motor M (corresponds to the range shown as $S_2$ in graph (b)) can be covered by charge of the battery 3*a*.

As can be seen from the above, in one or more embodiments of the present invention, when the electric air conditioner 3*b* is in a ON state, the driving force that corresponds to the power consumption consumed by the electric air conditioner 3*b* is subtracted from the target driving force ($P_{t0}$) and also an engine output ($P_E$) required to generate the power consumption consumed by the electric air conditioner 3*b* by the motor M is added to the output requested by the system and calculates the request output to the drive source. In this way, fluctuation in engine speed due to operation of the electric air conditioner 3*b* can be suppressed. Also, even when the electric air conditioner 3*b* starts its operation, while suppressing fluctuation in the engine speed, the operation point of the engine can be maintained above the a-line.

Also, in one or more embodiments of the present invention, when the electric air conditioner 3*b* is in a ON state, when the vehicle speed of the vehicle is equal to or below the predetermined vehicle speed ($V_{th}$), and when an accelerator opening is the predetermined value ($APO_{th}$) or below, request output is calculated without subtracting the driving force that corresponds to the power consumption consumed by the electric air conditioner 3*b* from the target driving force ($P_{t0}$) and without adding the engine output ($P_E$) to the output requested from the system. In this way creep driving force transmitted to the drive wheels FR and FL can be secured and also control can be performed so as not to lose hill-climbing ability.

Furthermore, in one or more embodiments of the present invention, when the drive mode of the vehicle is the EV mode and when the electric air conditioner 3*b* is in a ON state, the request output is calculated by subtracting the driving force that corresponds to the power consumption consumed by the electric air conditioner 3b from the target driving force ($P_{ro}$) and by adding the output that corresponds to the power consumption consumed by the electric air conditioner to the output requested by the system. In this way, when the drive mode switches between the EV mode and HEV mode, generation of torque difference can be suppressed. In the EV mode, because the engine is not driven, power consumption consumed by the electric air conditioner 3b is covered by discharge of the battery 3a. Also, addition processing to the output requested from the system is performed to discharge electric power for the amount of power consumption consumed by the electric air conditioner 3b by the battery 3a. For this reason, the output that corresponds to the power consumption (the output added to the request output from the system) consumed by the electric air conditioner 3b is equal to the engine output ($P_E$) of the HEV mode.

The above target driving force calculation unit 11 corresponds to "target driving force calculation unit" according to one or more embodiments of the present invention and the air conditioner managing unit 13 corresponds to the "air conditioner managing unit" according to one or more embodiments of the present invention. Also, the charge-discharge output calculation unit 12, air conditioner managing unit 13, engine output calculation unit 14, correction determination unit 15, driving force correction unit 16, request output calculation unit 17, and operation point command sending unit 18 correspond to "control unit" according to one or more embodiments of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

1 . . . Engine controller
2 . . . Motor controller
3 . . . Inverter
3a . . . Battery
3b . . . Electric air conditioner
10 . . . Integrated controller
11 . . . Target driving force calculation unit
12 . . . Charge-discharge output calculation unit
13 . . . Air conditioner managing unit
14 . . . Engine output calculation unit
15 . . . Correction determination unit
16 . . . Driving force correction unit
17 . . . Request output calculation unit
18 . . . Operation point command sending unit
100 . . . Hybrid vehicle

What is claimed is:

1. A control device for a hybrid vehicle comprising an engine, a motor which drives by power of a battery, and an air conditioner which operates by power of the battery, comprising:
a target driving force calculator configured to calculate a target value of driving force transmitted to a drive wheel from a driving source as a target driving force;
an air conditioner manager configured to manage an ON/OFF state of an air conditioner; and
a controller configured to calculate a request output by adding the target driving force to a system output requested to the drive source by a system request, calculate an operation point of the engine for optimally driving the engine in response to the request output, control the engine to drive at the operation point, and control the motor based on the request output,
wherein the controller calculates the request output by subtracting a driving force which corresponds to power consumption consumed by the air conditioner from the target driving force and by adding an engine output required to generate the power consumption by the motor to the system output, and controls the driving force transmitted to a drive wheel, when the air conditioner is in an ON state, and
wherein the controller calculates the request output without subtracting the driving force which corresponds to the power consumption from the target driving force when the air conditioner is in the ON state, vehicle speed of the hybrid vehicle is equal to or below a predetermined vehicle speed, and an accelerator opening is equal to or below a predetermined value.

2. The control device according to claim 1,
wherein the controller calculates the request output by subtracting a driving force which corresponds to the power consumption from the target driving force and by adding an output which corresponds to the power consumption to the system output when the hybrid vehicle drives in an EV mode in which only a motor is used as the drive source.

3. The control device according to claim 2,
wherein the controller limits a change rate of the driving force when subtracting the driving force which corresponds to the power consumption from the target driving force.

4. The control device according to claim 1,
wherein the controller limits a change rate of the driving force when subtracting the driving force which corresponds to the power consumption from the target driving force.

5. A method for controlling a hybrid vehicle comprising an engine, a motor which drives by electric power of a battery, and an air conditioner which operates by electric power of the battery, comprising:
calculating a target value for a driving force transmitted to a drive wheel from a drive source as a target driving force,
managing a ON/OFF state of the air conditioner,
calculating a request output by adding the target driving force to a system output requested to the drive source by a system request,
calculating an operation point of the engine for optimally driving the engine to the request output,
controlling the engine to drive at the operation point,
controlling the motor based on the request output,
calculating the request output by subtracting a driving force which corresponds to power consumption consumed by the air conditioner from the target driving force and by adding an engine output required to generate the power consumption by the motor to the system output, and controls the driving force transmitted to the drive wheel, when the air conditioner is in an ON state, and
calculating the request output without subtracting the driving force which corresponds to the power consumption from the target driving force when the air conditioner is in the ON state, vehicle speed of the hybrid vehicle is equal to or below a predetermined vehicle speed, and an accelerator opening is equal to or below a predetermined value.

* * * * *